Aug. 12, 1947.   E. W. DRESCHER   2,425,602
CANTILEVER SUPPORT FOR GIMBAL CARRIED INSTRUMENTS
Filed Jan. 13, 1945

INVENTOR.
ERNEST W. DRESCHER
BY Murray W. Gould
ATTY.

Patented Aug. 12, 1947

2,425,602

UNITED STATES PATENT OFFICE 2,425,602

CANTILEVER SUPPORT FOR GIMBAL CARRIED INSTRUMENTS

Ernest William Drescher, Manheim Township, Lancaster County, Pa., assignor to Hamilton Watch Company, Lancaster, Pa.

Application January 13, 1945, Serial No. 572,686

10 Claims. (Cl. 248—114)

This invention relates to a support for gimbal suspended instrument and is directed more particularly to the apparatus for immobilizing the gimbal suspension during transit.

The object of the invention is to provide a support for a gimbal suspended instrument which relieves the gimbal pivots from the weight of the instrument during transit, thus protecting them against damage.

Heretofore, marine chronometers, for example, have been supplied with means for locking the gimbal to prevent movement of the gimbal during shipment but such means still allows the weight of the chronometer to be supported by the gimbal pivots. As these pivots are part of a delicate mechanism they are small in relation to the weight of the chronometer supported and are generally made of brass. It oftentimes happens in shipment that the marine chronometer is subject to a fall or sudden jar which throws the weight of the chronometer against the gimbal pivots bending the pivots and ruining the action of the gimbal.

It is the object of the present invention to provide a resilient supporting means which will support the weight of the chronometer during shipment.

It is a further object of the present invention to provide means for supporting the weight of the chronometer during shipment which may be permanently mounted in the chronometer box and swung into or out of supporting position as desired.

It is a still further object of the present invention to provide means for supporting the chronometer which will not permit canting of the chronometer or gimbal when the supporting means is in supporting position.

It is a still further object of the present invention to provide a pair of cantilever arms which extend under and contact the marine chronometer and which support the marine chronometer.

A further object of the invention is to provide a pair of cantilever arms extending when in supporting position under the gimbal swung instrument, either arm supporting the instrument in an essentially horizontal position.

It is a still further object of the present invention to provide a pair of cantilever supports mounted in the chronometer box so that they be swung beneath the chronometer and gimbal to relieve the gimbal pivots of the weight of the chronometer.

It is a still further object of the present invention to provide a resilient supporting means consisting of a pair of cantilever arms which, when swung to chronometer supporting position, are securely locked in that supporting position.

It is a still further object of the invention to provide a resiliently mounted cantilever support which, when in supporting position, is locked against movement which would disengage the support.

It is a still further object of the present invention to provide a pair of cantilever supports which may be swung into supporting position to relieve the weight of a marine chronometer supported in gimbals and to so interfit with each other as to lock each other in supporting position.

It is a still further object of the present invention to provide a pair of cantilever supports mounted in the chronometer box and adapted to be positioned beneath the chronometer to support the weight of said chronometer and a spring used in conjunction with said supports and providing sufficient upward thrust on said supports to prevent downward motion of the chronometer from damaging the gimbal pivots.

A further object of the invention is to provide a support for a gimbal adapted to be housed in a protective box and attached to the same supporting members of said box as those in which the gimbal pivots are mounted.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawing in which.

Figure 1:
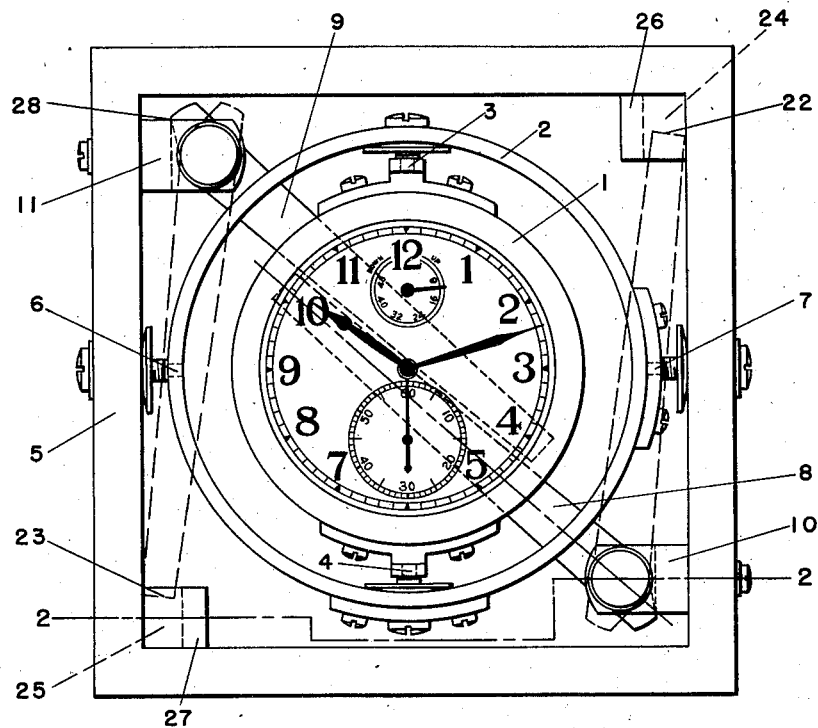
Fig. 1 is a top plan view showing the supporting cantilever arms in supporting position and (in dashed lines) shown in inoperative position.
Figure 2:
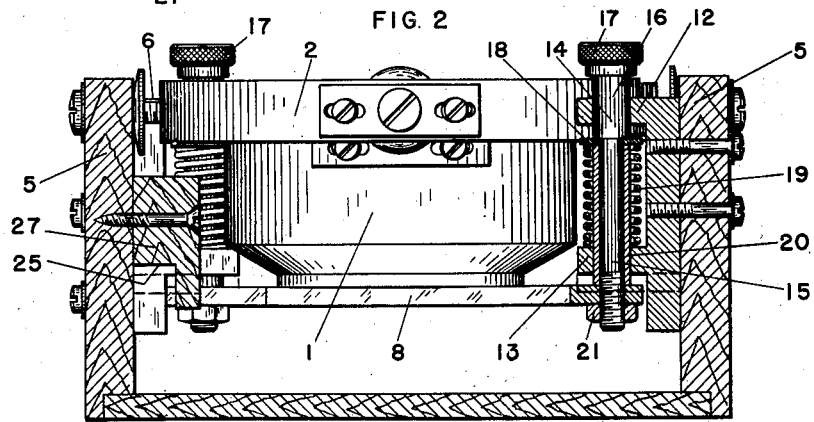
Fig. 2 is a section on line 2—2 of Fig. 1.
Figure 3:
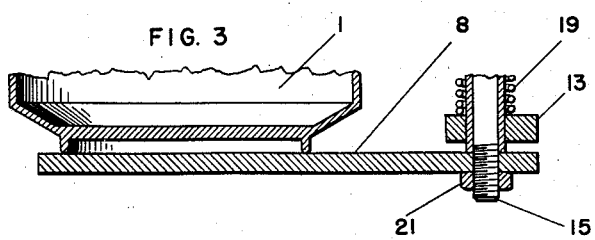
Fig. 3 is a detailed sectional view showing the contact of the arm with the bottom of the chronometer.

The marine chronometer 1 is supported by the usual gimbal 2 through pivots 3 and 4, which gimbal is in turn carried by the box 5 on pivots 6 and 7. That is the usual construction for mounting marine chronometers and provides a swinging support for the chronometer so that in use it will remain level regardless of the action of the ship on which it is carried. It is necessary, however, to ship the completed marine chronometer from the factory at which they are made to the ship on which they are to be installed and approximately once every three years these chronometers are boxed and returned to a repair station for cleaning and oiling. During these periods of transit the marine chronometer is often damaged due to incompetent handling and it is the purpose of this invention to provide a resilient supporting means which will prevent any damage to the gimbal suspension while in transit.

The supporting means consists of cantilever levers 8 and 9 mounted at opposite corners of the box 5 and half way between pivots 3 and 6 and 4 and 7. The position at which the cantilever arms is located is extremely important as will be hereinafter described.

Brackets 10 and 11 are secured by bolts at diagonally opposite corners of the box and are formed with an upper arm 12 and a lower arm 13. A shaft 14 is pivotally mounted in the upper and lower arms of the brackets 10 and 11 and is formed with a reduced partially threaded portion 15, an enlarged bearing portion 16 and a knurled head 17. Seated against the enlarged bearing portion 16 is a washer 18 which limits the upward movement of the shaft in the arms of the brackets 10 and 11 and furnishes a stop for a compression spring 19. A sleeve 20 partially covers the lower portion 15 of the shaft 14 and provides a bearing surface for the lower arm of the brackets 10 and 11 as well as forming a shoulder against which the arm 8 is securely held. The arm 8 is threaded on the lower end of the shaft 14 and a jam nut 21 secures it in place.

The extended bearing surface 16 of the shaft 14 allows the shaft to be moved longitudinally against the action of the spring 19 in the arms 12 and 13 of the brackets 10 and 11. Ordinarily the arms 8 and 9 are in the position shown in the dashed lines in Fig. 1, the ends 22 and 23 of the arms being secured in the notches 24 and 25 of the blocks 26 and 27 carried at opposite corners of the box 5.

When it is desirable to lock the gimbal suspension against any movement whatsoever the shafts 14 are depressed to permit exit of the arms from the notched blocks, and turned through the knurled head 17 swinging the arms 8 and 9 through the position shown in Fig. 1, one of said arms passing under the other of said arms and locking both arms in supporting position. The edge of the bracket 28 engages the tail of the arm to provide a stop limiting the outward swinging movement of arms 8 and 9. A support is thus provided which extends entirely across the bottom of the marine chronometer and engages the chronometer on a diagonal line midway between the axes of the gimbal suspension. Thus in the original setting when one supporting arm is swung to position the chronometer is not canted or tilted and the swinging of the other arm is not interfered with. As can be clearly seen from Fig. 1 that except for the possible small movement indicated by the space between the two arms, the arms are securely locked in position and the chronometer is supported by the springs 19 against any downward force.

What is claimed is:

1. A chronometer support, comprising supporting means resiliently mounted in brackets, means for positioning said supporting means beneath and in contact with said chronometer, and means for locking said supporting means in supporting position.

2. A support for a gimbal mounted chronometer comprising a pair of pivoted arms, means for moving said arms into contacting position with said instrument and means for locking said arms in said contacting position.

3. A support for a gimbal mounted chronometer comprising means for resiliently supporting said chronometer by a pressure opposed to the weight of said chronometer, said pressure being applied equally on each side of a diametric plane passing through said chronometer and substantially midway between each of the axes of the gimbal suspension.

4. A support for a gimbal mounted chronometer comprising a pair of pivoted arms, means for moving said arms to a position on each side of a center line of said chronometer vertically mounted shafts carrying said arms and resilient means supporting said shafts and opposing the weight of said chronometer.

5. A support for a gimbal mounted instrument comprising a pair of pivotally mounted cantilever arms extending under and engaging the bottom of said instrument, means for forcing both of said arms into engagement with the bottom of said instrument to relieve the said gimbal of the weight of said instrument, each of said arms extending across and contacting the circumference of the bottom of said instrument at diametrically opposite points, either of said arms supporting the instrument in a substantially horizontal position.

6. A support for a timepiece comprising a housing box, a gimbal pivotally mounted in opposite sides of said box, a pair of vertical brackets mounted in diagonally opposed corners of said box and on the same sides as said gimbal pivots, a pair of bolts vertically movable in said brackets and a pair of arms mounted on said bolts adapted to be swung beneath said timepiece to support said timepiece and to relieve the weight of said timepiece from said gimbal pivots.

7. A support for a timepiece comprising a housing box, a gimbal pivotally mounted in opposite sides of said box and pivotally supporting said timepiece, the axes of said pivots being at right angles to each other, a pair of brackets attached to said box and on the same side as said gimbal pivots, a pair of arms carried by said brackets and adapted to be positioned beneath said timepiece along an axis substantially midway between said pivotal axes, and means forcing said arms against said timepiece to relieve said gimbal pivots of the weight of said timepiece.

8. A support for a timepiece comprising a housing box, a gimbal suspension pivotally supporting said timepiece and pivotally mounted in opposite sides of said box, the axes of said pivotal suspension of said timepiece and said pivotal suspension of said gimbal being at right angles to each other, a pair of brackets mounted in said housing box and on the same side as said gimbal pivotal mounting, bolts slidably carried by said brackets, arms adapted to be positioned beneath said timepiece and rigidly carried by said bolts, means for turning said arms to a position beneath said timepiece, and coil springs carried on said bolts and engaging said turning means to force said arms resiliently upward against said timepiece to relieve the suspension pivots of the weight of said timepiece.

9. A support for a timepiece comprising a housing box, a gimbal suspension pivotally supporting said timepiece and pivotally mounted in opposite sides of said box, the axes of said pivotal suspension of said timepiece and said pivotal suspension of said gimbal being at right angles to each other, a pair of cantilever arms pivotally mounted on the same side of said housing box as said gimbal is pivoted on, means for moving said arms vertically and in a restricted arc whereby said arms may be positioned substantially midway of the axes of said pivotal suspensions, the arms locking each other to prevent any substantial movement in a horizontal plane.

10. A support for timepieces comprising a housing box, a gimbal suspension pivotally supporting said timepiece and pivotally supported in opposite sides of said box, the axes of said pivotal suspensions being at right angles to each other, a pair of cantilever arms pivotally mounted on said housing box, means for moving said arms vertically and in an arc, means limiting the extent of vertical movement, means limiting the movement of either of the arms through its arc, each of said arms serving to lock the other arm at a position substantially midway between the axes of suspension of said gimbal.

ERNEST WILLIAM DRESCHER.

REFERENCES CITED

The following references are of record in the file of this patent:

UNITED STATES PATENTS

| Number | Name | Date |
|---|---|---|
| 619,265 | Banker | Feb. 14, 1899 |
| 1,163,394 | Coughenour | Dec. 7, 1916 |
| 1,716,484 | Carrey | June 11, 1929 |